United States Patent [19]

Vogt et al.

[11] Patent Number: 5,199,669
[45] Date of Patent: Apr. 6, 1993

[54] ROTARY PARACHUTE

[75] Inventors: Karl-Heinz Vogt, Essen; Heinz Olmscheid, Castrop-Rauxel, both of Fed. Rep. of Germany

[73] Assignee: Rheinmetall GmbH, Düsseldorf, Fed. Rep. of Germany

[21] Appl. No.: 922,230

[22] Filed: Jul. 31, 1992

[30] Foreign Application Priority Data

Aug. 16, 1991 [DE] Fed. Rep. of Germany ....... 4127022

[51] Int. Cl.$^5$ ............................................. B64D 17/02
[52] U.S. Cl. ..................................................... 244/145
[58] Field of Search ........... 244/142, 145, 152, 153 A, 244/153 R; 416/240; 446/217; 440/8

[56] References Cited

U.S. PATENT DOCUMENTS

| | | | |
|---|---|---|---|
| D. 278,131 | 3/1985 | Felix | 416/240 A |
| 2,701,697 | 2/1955 | Ewing | 244/145 |
| 2,724,567 | 11/1955 | Adams | 244/145 |
| 2,770,432 | 11/1956 | Stevinson | 244/145 |
| 4,276,033 | 6/1981 | Krovina | 416/240 A |
| 4,685,642 | 8/1987 | Schloss | 244/153 A |
| 5,094,408 | 3/1992 | Doherr et al. | |

Primary Examiner—Galen Barefoot
Attorney, Agent, or Firm—Spencer, Frank & Schneider

[57] ABSTRACT

A rotary parachute includes a canopy having an apex and comprised of triangular, sewn-together fabric segments each having a base edge along an outer circumference of the canopy, a tip opposite the base edge and longitudinal edges on either side of said tip with seams connecting together the adjacent longitudinal edges of adjacent segments and rotation slits existing in regions of the respective seams. The tip of each segment is offset laterally from the apex of the canopy to form an apex opening in the canopy having a shape of a regular polygon and the base edges are offset from one another so that each segment has a circumferentially projecting tip.

5 Claims, 3 Drawing Sheets

ROTARY PARACHUTE

CROSS REFERENCE TO RELATED APPLICATIONS

The present application claims the rights of priority with respect to application Ser. No. P 41 27 022.3 filed Aug. 16, 1991, in Germany, the subject matter of which is incorporated herein by reference.

BACKGROUND OF THE INVENTION

The present invention relates to a rotary parachute including a canopy provided with rigging lines and composed of triangular segments which are sewn together to leave an apex opening and rotation slits in the region of the seams.

Rotary parachutes, as they are employed for submunition units ejected from a spin stabilized carrier casing and initially decelerated and caused to stop spinning, serve to convert the flight of the submunition unit to a stationary rotary descent, with the spin rate and the rate of descent being coupled together by way of the parachute characteristics.

German Offenlegunsschrift [laid open patent application] No. 3,941,806 and corresponding U.S. Pat. No. 5,094,408 disclose a rotary parachute of the above mentioned type in which the canopy is composed of fabric segments each of which comprises a triangular section having its tip at the apex omitted and which, on its outer circumference and at one side, is extended by a trapezoidal section. The lateral trapezoidal section serves to form a tangentially directed air exit nozzle while the trapezoidal section at the outer circumference serves to provide a drawn-in guide zone, with horizontal stabilizing slits being provided between the triangular section and the trapezoidal section at the outer circumference. Aside from the fact that the fabric segments are cut according to a relatively complicated pattern with concomitant loss of material, it is not possible to easily adapt the rotary parachute to required performance data.

SUMMARY OF THE INVENTION

It is therefore an object of the present invention to provide a rotary parachute of the type first described above which is composed of fabric segments cut according to a simple, material-saving pattern and which can easily be adapted to required performance data.

The above and other objects are accomplished in accordance with the invention by the provision of a rotary parachute, comprising: a canopy having an apex and comprised of triangular, sewn-together fabric segments each having a base edge along an outer circumference of the canopy, a tip opposite the base edge and longitudinal edges on either side of said tip with seams connecting together the adjacent longitudinal edges of adjacent segments and rotation slits existing in regions of the respective seams, the tip of each segment being offset laterally from the apex of the canopy to form an apex opening in the canopy having a shape of a regular polygon and the base edges being offset from one another so that each segment has a circumferentially projecting tip.

The invention will now be described in greater detail with reference to an embodiment thereof that is illustrated in the attached drawing figures.

DESCRIPTION OF THE PREFERRED EMBODIMENT

Figure 1:
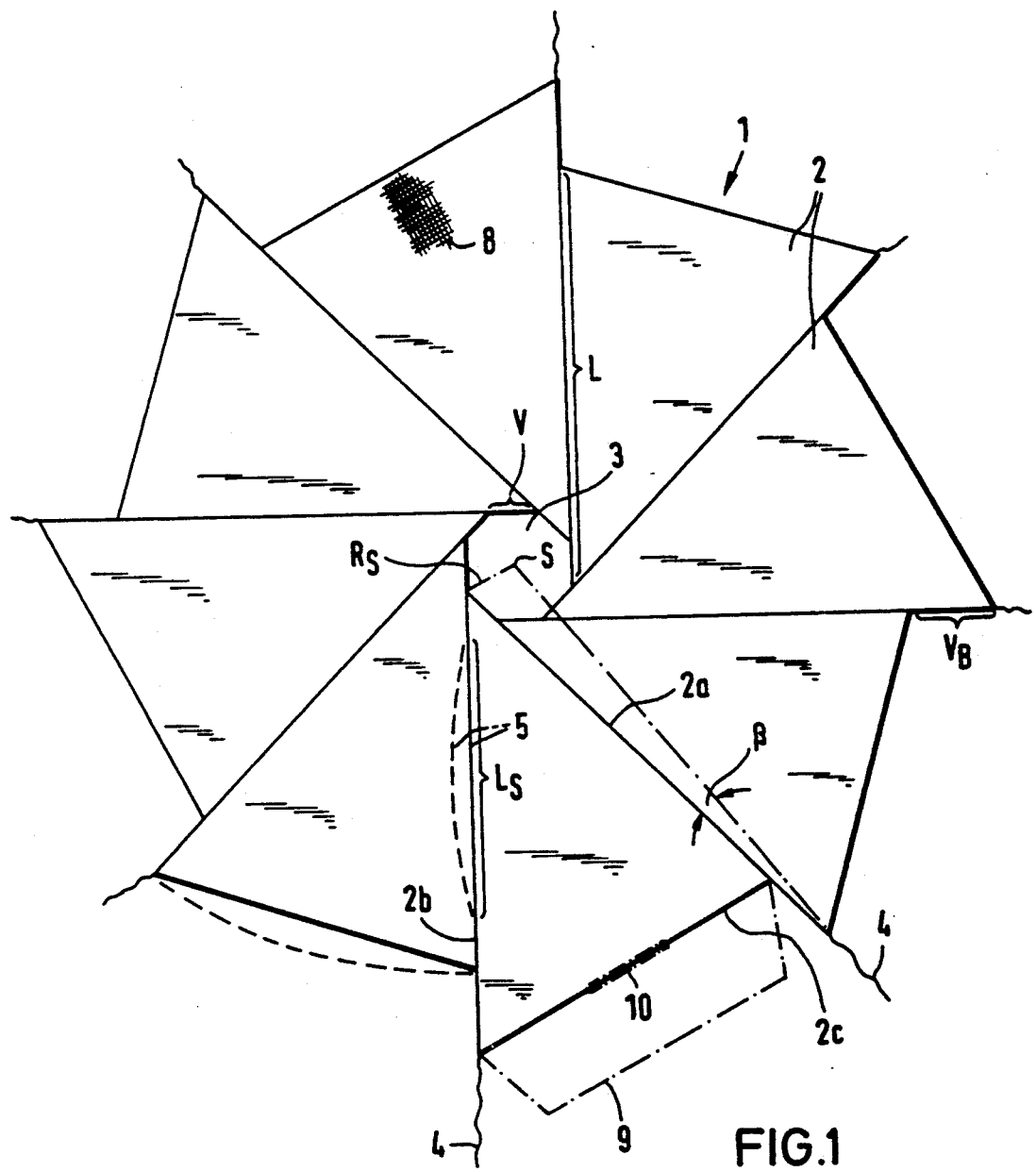
FIG. 1 is a top view of a deployed canopy of a rotary parachute in accordance with the invention.
Figure 1A:
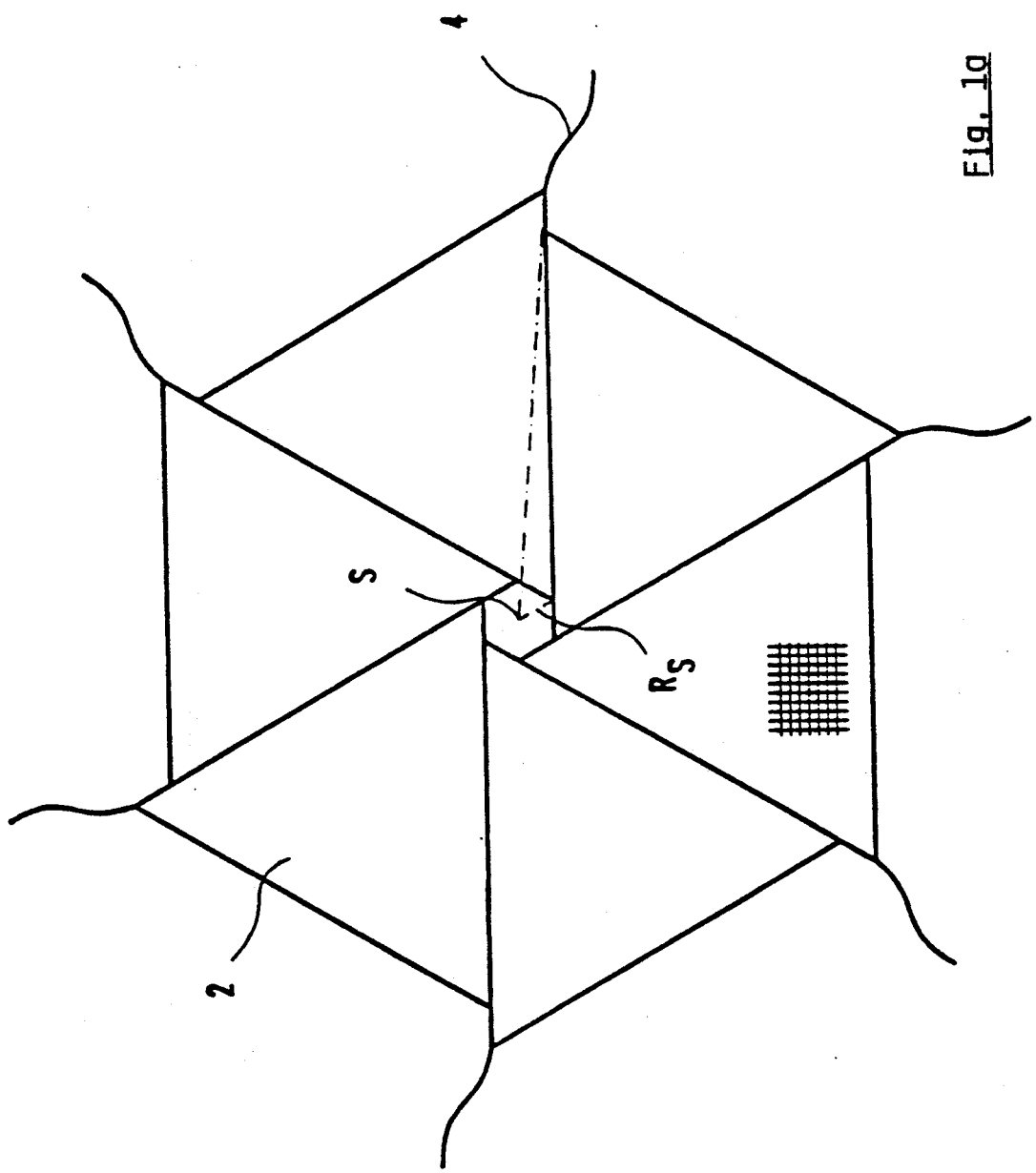
FIG. 1a shows a canopy consisting of six equilateral triangles.

Referring to FIG. 1, there is shown a rotary parachute which includes a canopy 1 composed of triangular fabric segments 2 which may desirably have the shape of an isosceles triangle or of an equilateral triangle. Triangular fabric segments 2 each have longitudinal edges 2a and 2b which come together at a tip T which is disposed opposite a base edge 2c at the circumference of the canopy. Canopy 1 has an apex S where there is an apex opening 3 produced by an arrangement of tips T which are offset relative to one another along respective longitudinal edges by a distance V and which are thus offset laterally relative to apex S by a length $R_S$. Length $R_S$ defines an offset angel $\beta$ between longitudinal edge 2a of the respective fabric segment 2 facing apex S and a straight line through apex S and the circumferential end point of the longitudinal edge 2b of the adjacent fabric segment 2 that is adjacent longitudinal edge 2a. This arrangement of tips T produces an apex opening 3 in the form of a regular polygon having a maximum diameter of $2R_S$. Additionally, a base offset $V_B$ is provided for the adjacent base edges 2c of fabric segments 2. Thus, base edges 2c extend, as a function of the selection of offset angle $\beta$, obliquely to the base (longitudinal edge 2b) of a triangle whose tip is not offset relative to apex S. Rigging lines 4 engage at each one of the outwardly projecting tips 10 formed in this way on the circumference of the canopy.

Fabric segments 2 are sewn to one another at their adjacent longitudinal edges 2a and 2b, leaving a rotation slit 5 of a predetermined length $L_S$. The seams on the sides of the triangle have a length $1 = L - V - V_B L_S$, where L is the length of longitudinal edge 2b (and for equilateral triangles also longitudinal edge 2a and of base edge 2c). Rotation slits 5 are defined on both sides by a seam section of predetermined length, while their maximum opening width is determined by pushing in longitudinal side 2a for a corresponding amount during sewing, thus determining the final base offset $V_B$. (The triangular segments in FIG. 1 each have the shape of an isosceles triangle in the flat, pre-sewn stage, before side 2a is pushed in.) The curvature of fabric segments 2 and of rotation slits 5 during operation of the parachute is indicated in dashed lines in FIG. 1.

The base offset $V_B$ and thus outwardly projecting tips 10 of fabric segments 2 cause the air to be deflected in the tangential direction and thus cause canopy 1 to rotate in the opposite direction.

Figure 2:
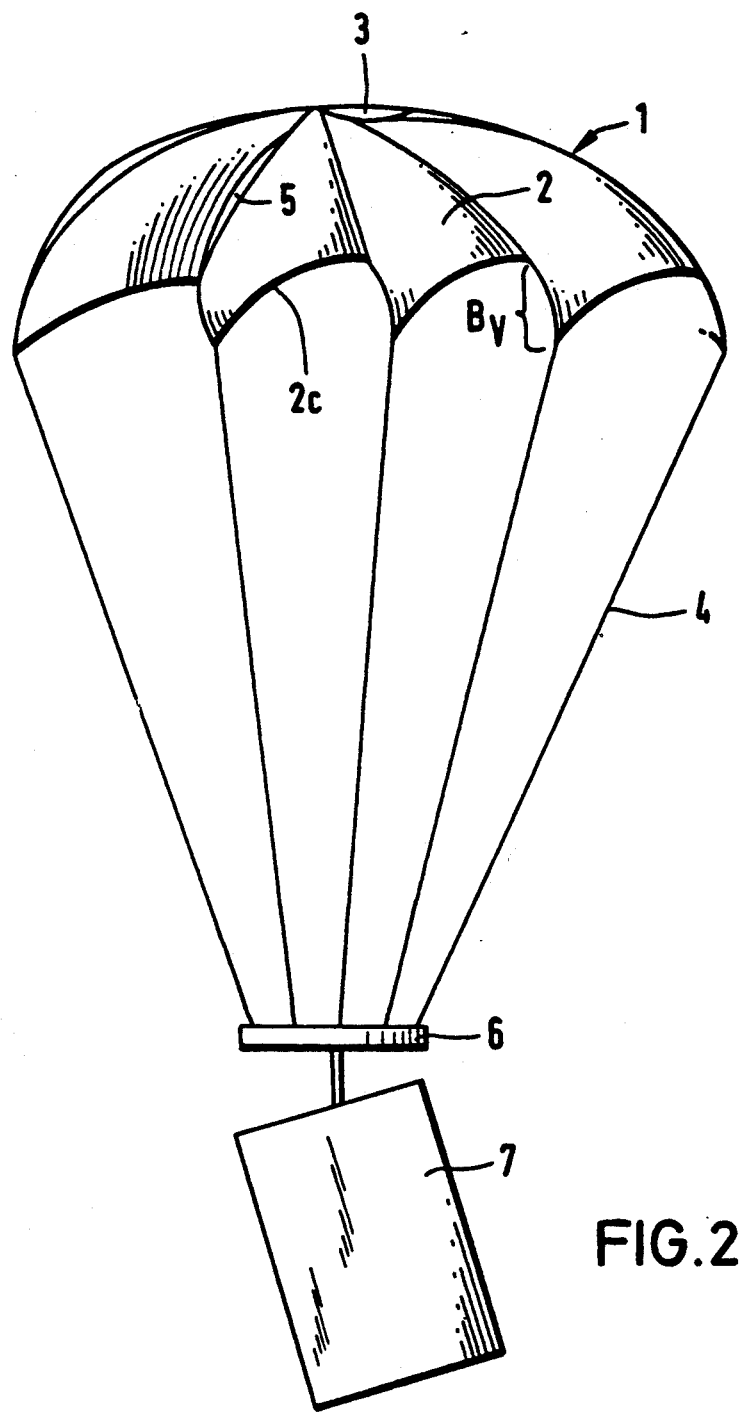
FIG. 2 is a schematic which shows a side view of the rotary parachute according to FIG. 1 in operation.

As can be seen in FIG. 2, rigging lines 4 are fastened to an articulation ring 6 which carries a load 7, for example a submunition unit.

By changing the offset angle $\beta$ and/or the length $L_S$ of the rotation slit and/or the base offset $V_B$ (and thus the maximum rotation slit width) it is possible to adapt the parachute, without changing fabric segments 2, to the required performance data within wide limits.

Advisably, the warp or weft yarns 8 of fabric segments 2, which preferably are woven in a linen weave, extend parallel to the center line on the base edge 2c of the triangular fabric segments 2 so that the same tension conditions are created at the seams between the sewn longitudinal edges 2a and 2b on both sides of the triangular fabric segment 2.

Fabric segments 2 may be extended at their base edges by a trapezoidal section 9 (shown in dash-dot lines in FIG. 1) in which case a stabilization slit 11 is provided in the region of the connecting line between the two sections. This slit extends horizontally when the parachute is descending and permits the radial escape of air from the parachute, thus providing for greater dynamic stability of the parachute while reducing its tendency to pendulum movements if this should be necessary.

In a manner not illustrated, apex lines disposed in the region of apex opening 3 in conjunction with a central line permit the adjustment of the shape of the canopy.

It will be understood that the above description of the present invention is susceptible to various modifications, changes and adaptations, and the same are intended to be comprehended within the meaning and range of equivalents of the appended claims.

What is claimed is:

1. A rotary parachute, comprising
   a canopy having an apex and comprised of triangular, sewn-together fabric segments each having a base edge along an outer circumference of the canopy, a tip opposite the base edge and longitudinal edges on either side of said tip with seams connecting together the adjacent longitudinal edges of adjacent segments and rotation slits existing in regions of the respective seams, the tip of each segment being offset laterally from the apex of the canopy to form an apex opening in said canopy having a shape of a regular polygon and the base edges being offset from one another so that each segment has a circumferentially projecting tip.

2. A rotary parachute as defined in claim 1, and further comprising rigging lines engaging at the circumferentially projecting tips.

3. A rotary parachute as defined in claim 1, wherein said segments have a shape of an equilateral triangle.

4. A rotary parachute as defined in claim 1, wherein the fabric of each said segment has a warp or weft direction of which is parallel to a center line on the base edge.

5. A rotary parachute as defined in claim 1, and further comprising a trapezoidal shaped, fabric extension attached to each said base edge on the outer circumference of said canopy, with a stabilization slit being disposed between said trapezoidal extension and said triangular segment.

* * * * *